United States Patent [19]

Doi et al.

[11] Patent Number: 5,022,990
[45] Date of Patent: Jun. 11, 1991

[54] POLYVINYLIDENE FLUORIDE POROUS MEMBRANE AND A METHOD FOR PRODUCING THE SAME

[75] Inventors: Yoshinao Doi, Moriyama; Haruo Matsumura, Iruma, both of Japan

[73] Assignee: Asahi Kasei Kogyo Kabushiki Kaisha, Osaka, Japan

[21] Appl. No.: 463,058

[22] Filed: Jan. 10, 1990

[30] Foreign Application Priority Data

Jan. 12, 1989 [JP] Japan ................................. 1-3675

[51] Int. Cl.⁵ ...................... B01D 53/22; B01D 71/34
[52] U.S. Cl. ............................ 210/500.42; 210/500.23; 264/41
[58] Field of Search ..................... 55/158; 210/500.23, 210/500.35, 500.41, 500.42; 264/41

[56] References Cited

U.S. PATENT DOCUMENTS

| | | | |
|---|---|---|---|
| 3,642,668 | 2/1972 | Bailey et al. | 210/500.42 X |
| 3,855,133 | 12/1974 | Roehsler | 210/500.42 X |
| 3,862,030 | 1/1975 | Goldberg | 210/500.42 X |
| 3,929,950 | 12/1975 | Nakamura et al. | 264/41 X |
| 4,177,228 | 12/1979 | Prölss | 210/500.42 X |
| 4,203,847 | 5/1980 | Grandine, II | 210/500.42 X |
| 4,203,848 | 5/1980 | Grandine, II | 210/500.42 X |
| 4,234,528 | 11/1980 | Nussbaumer et al. | 264/41 |
| 4,237,083 | 12/1980 | Young et al. | 264/41 |
| 4,499,211 | 2/1985 | Walch et al. | 210/500.42 X |
| 4,806,291 | 2/1989 | Susa | 210/500.42 X |
| 4,810,384 | 3/1989 | Fabre | 210/500.42 X |
| 4,833,172 | 5/1989 | Schwarz et al. | 264/41 X |
| 4,842,741 | 6/1989 | Coughlin et al. | 264/41 X |
| 4,921,653 | 5/1990 | Aoyama et al. | 264/41 |

FOREIGN PATENT DOCUMENTS

| | | | |
|---|---|---|---|
| 0330072 | 8/1989 | European Pat. Off. | 55/158 |
| 037836 | 10/1981 | Japan . | |
| 58-091732 | 5/1983 | Japan | 210/500.42 |
| 58-93734 | 6/1983 | Japan . | |
| 60-97001 | 5/1985 | Japan . | |
| 2168981 | 7/1986 | United Kingdom . | |
| 2190039 | 11/1987 | United Kingdom | 210/500.35 |

OTHER PUBLICATIONS

Patent Abstract of Japan, vol. 7, No. 1191(C-182) [1336] Aug. 20, 1983 (abstract of JP-A-58 91 732: May 31, 1983).

*Primary Examiner*—Robert Spitzer
*Attorney, Agent, or Firm*—Armstrong, Nikaido, Marmelstein, Kubovcik & Murray

[57] ABSTRACT

A porous membrane comprising a polyvinylidene fluoride resin and having a uniform, three-dimensional, network pore structure. The membrane has excellent chemical resistance, excellent filtering characteristics and excellent mechanical properties. The porous membrane can be produced by blending a polyvinylidene fluoride resin, an organic liquid and a powdery hydrophobic silica, subjecting the resultant blend to melt-molding to form a membrane, and extracting the organic liquid and the hydrophobic silica from the melt-molded membrane.

12 Claims, 5 Drawing Sheets

POLYVINYLIDENE FLUORIDE POROUS MEMBRANE AND A METHOD FOR PRODUCING THE SAME

BACKGROUND OF THE INVENTION

1. Field Of The Invention

The present invention relates to a porous membrane comprising a polyvinylidene fluoride resin and having a uniform, three-dimensional, network pore structure and excellent chemical resistance, excellent filtering characteristics and excellent mechanical properties. The present invention is also directed to a method for producing the porous membrane.

2. Discussion Of Related Art

It is known that polyvinylidene fluoride resin is a useful material for porous membranes having excellent chemical resistance, thermal resistance and mechanical properties.

Heretofore, various porous membranes comprising a polyvinylidene fluoride resin have been proposed. Most of the conventional porous membranes are produced by the wet methods. These conventional membranes have non-uniform porous structures and also have skin layers and, therefore, are poor in mechanical strength. In Japanese Patent Application Laid-Open Specification No. 60-97001, one of the wet methods for preparing a porous membrane having a network structure is proposed. However, the proposed wet method involves a problem in that the membrane produced by the method is poor in mechanical strength. On the other hand, in Japanese Patent Application Laid-Open Specification No. 58-93734, a method is proposed for producing a porous membrane, which comprises blending a polyvinylidene fluoride resin, an organic liquid and a hydrophilic inorganic filler, subjecting the resultant blend to melt-molding to form a membrane and extracting the organic liquid and the hydrophilic inorganic filler from the membrane. However, the porous membrane produced by this method has a disadvantage in that it has many macrovoids and is poor in tensile elongation at break. Therefore, the porous membrane cannot be used at high temperature under high pressure.

As described above, heretofore, a porous membrane having a uniform, three-dimensional, network pore structure and having excellent mechanical strength has not been produced.

SUMMARY OF THE INVENTION

The present inventors have made extensive and intensive studies with a view toward obtaining a polyvinylidene fluoride porous membrane which is free from the drawbacks inevitably accompanying the conventional porous membranes. As a result, it has unexpectedly been found that when a powdery hydrophobic silica is used as an inorganic filler instead of the hydrophilic inorganic filler used in the above-described method for producing a polyvinylidene fluoride resin porous membrane where a polyvinylidene fluoride resin is blended with an organic liquid and a hydrophilic inorganic filler, followed by melt-molding to form a membrane, and extracting the organic liquid and the inorganic filler from the membrane, a porous membrane having a uniform, three-dimensional, network pore structure can be obtained, and that the obtained porous membrane has excellent chemical resistance and mechanical strength as compared to the conventional porous membranes. Based on these findings, the present invention has been completed.

Accordingly, it is an object of the present invention to provide a porous membrane comprising a polyvinylidene fluoride resin, which has a uniform, three-dimensional, network pore structure and has excellent chemical resistance and mechanical strength.

It is another object of the present invention to provide an effective method for producing a porous membrane having the above characteristics.

The foregoing and other objects, features and advantages of the present invention will be apparent to those skilled in the art from the following detailed description and appended claims taken in connection with the accompanying drawings.

DETAILED DESCRIPTION OF THE INVENTION

Figure 1:
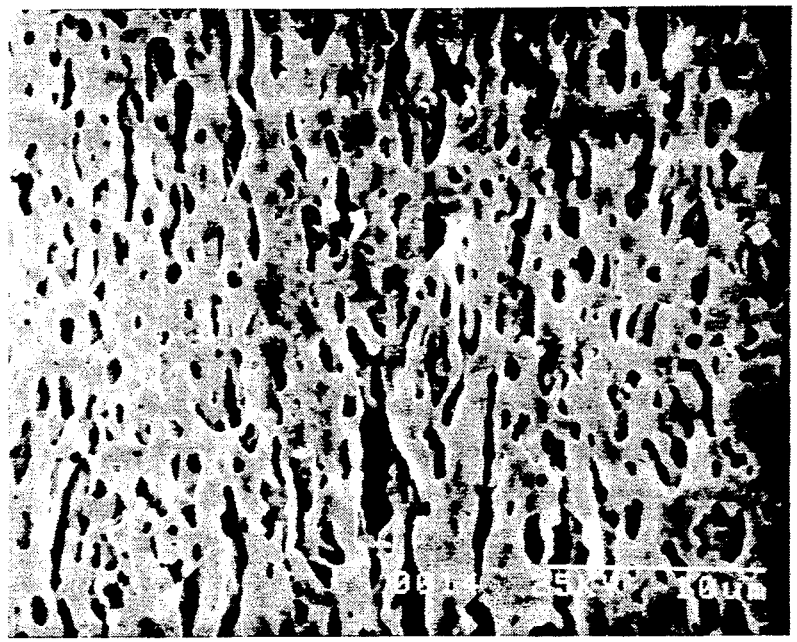
FIG. 1(a) is a scanning electron photomicrograph (magnification: 3,000-fold) of the outer surface of a hollow fiber porous membrane of the present invention produced in Example 1.
FIG. 1(b) is a scanning electron photomicrograph (magnification: 3,000-fold) of the inner surface of a hollow fiber porous membrane of the present invention produced in Example 1.
FIG. 1(c) is a scanning electron photomicrograph (magnification: 3,000-fold) of a cross-section of a hollow fiber porous membrane of the present invention produced in Example 1 taken along a line perpendicular to each surface of the membrane.
FIG. 1(d) is a scanning electron photomicrograph (magnification: 200-fold) of a cross-section of a hollow fiber porous membrane of the present invention produced in Example 1 taken along a line perpendicular to each surface of the membrane.
Figure 1:
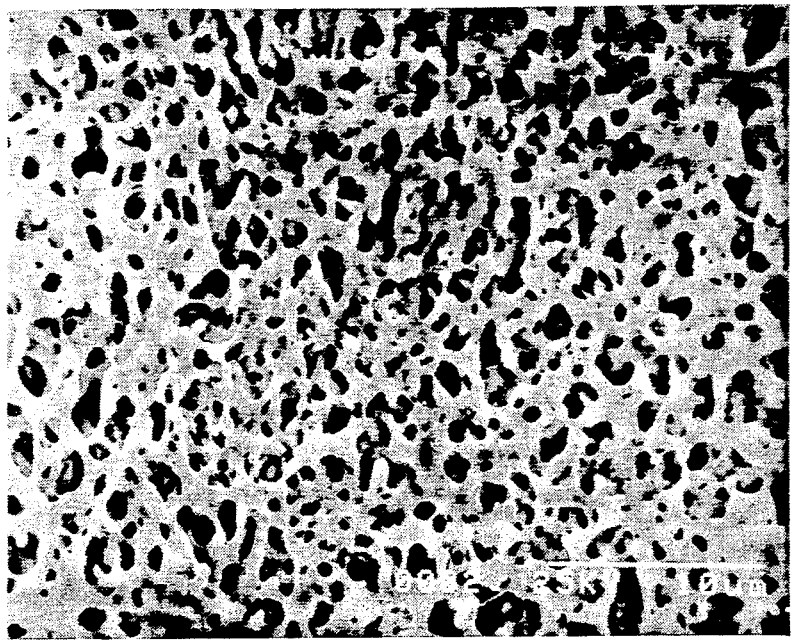
Figure 1C:
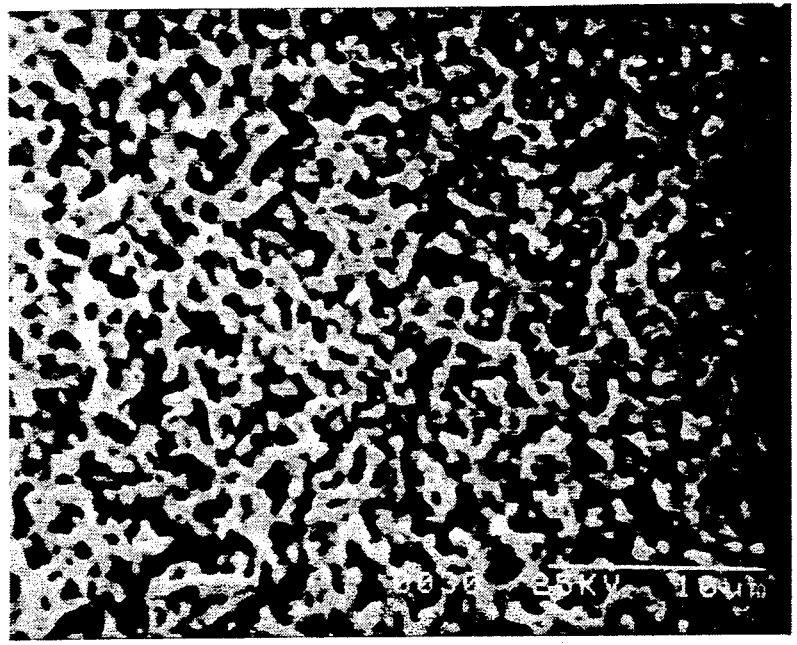
Figure 1:
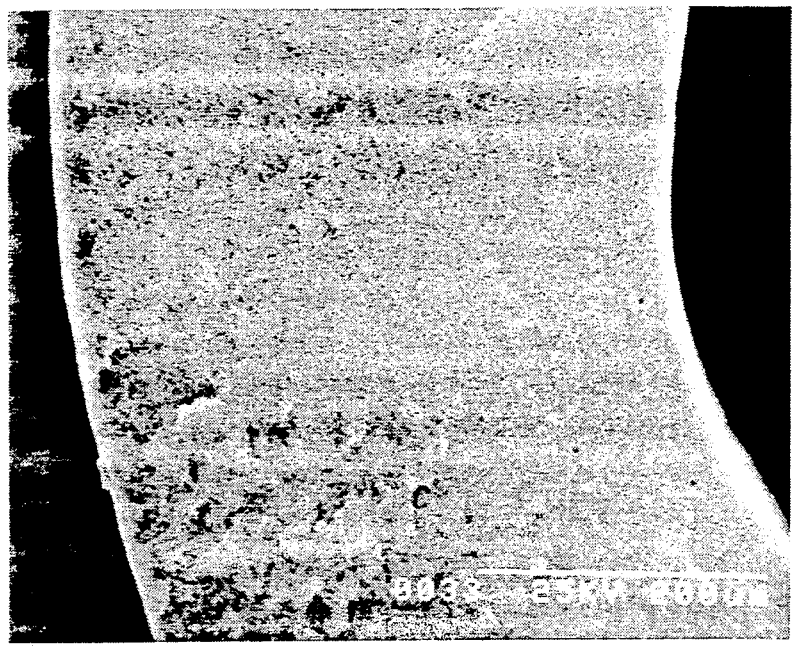

Essentially, according to the present invention, there is provided a porous membrane comprising a polyvinylidene fluoride resin and having pores running throughout an interior of the porous membrane and opening at both surfaces of the porous membrane, the interior of the porous membrane containing substantially no macrovoids having a diameter of 10 $\mu$m or more, the average diameter of the pores in each surface of the porous membrane being within the range of from 0.05 $\mu$m to less than 5 $\mu$m, the ratio of an average pore diameter of the open pores in each surface of the porous membrane to an average pore diameter of the pores in the interior of the porous membrane in terms of an average pore diameter of pores in a cross-section of the porous membrane taken along a line perpendicular to each surface of the porous membrane, being from 0.5 to 2.0, the ratio of the maximum pore diameter of the pores as measured by the bubble point method to a true average pore diameter of the pores as measured by the half-dry method being 1.2 to 2.5, and the membrane having a uniform, three-dimensional, network pore structure, and a tensile strength at break of from 70 to 200 kg/cm$^2$, tensile elongation at break of from 100 to 500% and a porosity of 40 to 90%.

The porous membrane of the present invention comprises a polyvinylidene fluoride resin. Representative examples of suitable polyvinylidene fluoride resins include a vinylidene fluoride homopolymer and a vinylidene fluoride copolymer. As a vinylidene fluoride copolymer, there can be mentioned a copolymer of vinylidene fluoride and at least one comonomer selected from the group consisting of ethylene tetrafluoride, propylene hexafluoride, trifluorochloroethylene and ethylene. Of these, preferred is a vinylidene fluoride homopolymer. The above-mentioned resins can be used alone or in combination.

The weight average molecular weight (hereinafter referred to as "$\overline{M}w$") of the polyvinylidene fluoride resin is preferably in the range of 100,000 to 1,000,000, and more preferably, 150,000 to 500,000. When the $\overline{M}w$ of the polyvinylidene fluoride resin is less than 100,000, it is disadvantageous in that the tensile elongation of the porous membrane is as small as less than 50% and, therefore, the porous membrane is brittle and cannot be practically used.

When the $\overline{M}w$ of the polyvinylidene fluoride resin is more than 1,000,000, the flowability of the polyvinylidene fluoride resin at the time of melt-molding is poor and, therefore, the moldability of the resin into a pellicle by T-die extrusion molding and the moldabilty by injection molding are adversely affected. Further, it is also disadvantageous in that the average pore diameter of the pores in the surface of the membrane produced from the polyvinylidene fluoride resin becomes too small, i.e., less than 0.05 μm, and not only the total area of the pore openings in the surfaces of the membrane but also the porosity of the membrane is likely to be decreased, leading to a lowering of the water permeability of the membrane.

The porous membrane of the present invention has pores running throughout an interior of the porous membrane and opening at both surfaces of the membrane, and the interior of the porous membrane of the present invention contains substantially no macrovoids having a diameter of 10 μm or more and, preferably, no macrovoids having a diameter of 5 μm or more. That is, it is required that when the porous membrane of the present invention is cut at an arbitrary portion in order to observe the interior of the membrane and the exposed cross-section of the membrane is examined, such a macrovoid is not observed.

The average pore diameter of the pores in each surface of the porous membrane is within the range of from 0.05 to less than 5 μm as measured by a scanning electron microscope. The above-mentioned average diameter is a weighted average diameter calculated from the averages of the major and minor diameters of 200 pore openings appearing in the surface of the membrane, which major and minor diameters are measured by means of a scanning electron microscope. When the average pore diameter of the porous membrane is less than 0.05 μm, the porous membrane does not exhibit the desired filtering properties. When the average pore diameter of the porous membrane is 5 μm or more, the pores disadvantageously act as a pin hole so that the properties of the porous membrane are lowered.

The ratio of the average pore diameter of the pore openings in each surface of the porous membrane (for example, each of the outer surface and the inner surface in the case of a hollow fiber membrane) as measured by means of a scanning electron microscope to the average pore diameter of the pores in the interior of the porous membrane in terms of an average pore diameter of pores in a cross-section of the porous membrane taken along a line perpendicular to each surface of the porous membrane as measured by means of a scanning electron microscope, is from 0.5 to 2.0.

The porous membrane of the present invention has a narrow pore diameter distribution. That is, the ratio of the maximum pore diameter as measured by the bubble point method prescribed in ASTM F316-70 to a true average pore diameter as measured by the half-dry method prescribed in ASTM F316-70 is from 1.2 to 2.5. Due to the narrow pore diameter distribution, the porous membrane of the present invention has excellent filtering characteristics and excellent separation properties. The term "true average pore diameter" used herein is intended to mean an average pore diameter which most approximates an average of the true diameters of all pores present in the porous membrane including the surface portion and interior portion thereof and which is measured in accordance with the method of ASTM F316-70.

Since the pores of the porous membrane of the present invention have the above-mentioned specific characteristics, a uniform, three-dimensional, network pore structure is provided in the porous membrane of the present invention. The term "uniform, three-dimensional, network pore structure" used herein is intended to mean that when the pore structures are observed by means of an electron microscope with respect to any 10 μm-square surface and cross-sectional areas of the porous membrane, the structures are substantially the same in regard to the pore size and configuration. Such uniform pore structures can be confirmed, for example, in FIGS. 1 (a), (b) and (c) which show, respectively, scanning electron photomicrographs of the outer surface, inner surface and cross-section of a porous membrane of the present invention which has a hollow fiber form.

The porous membrane of the present invention has a porosity of 40 to 90%. The porosity is measured by a method as described below. When the porosity of the porous membrane exceeds 90%, it s disadvantageous in that the mechanical strength of the porous membrane is poor because the amount of the polyvinylidene fluoride resin constituting the matrix of the membrane is too small. When the porosity of the porous membrane is less than 40%, it is disadvantageous in that the water permeability of the porous membrane is poor.

The membrane of the present invention has a tensile strength at break of 70 to 200 kg/cm$^2$ and a tensile elongation at break of 100 to 500%. These excellent mechanical strengths of the porous membrane of the present invention are believed to be due to the entwinement of the molecules of polyvinylidene fluoride resin constituting the matrix of the membrane. Such entwinement of the molecules of the polyvinylidene fluoride resin is achieved by melt-molding the resin as described later. When the tensile strength at break is less than 70 kg/cm$^2$ or the tensile elongation at break is less than 100%, the porous membrane is too poor in mechanical strength to be practically used.

The porous membrane of the present invention having the above-mentioned uniform, three-dimensional, network pore structure and having excellent mechanical strengths and filtering properties can advantageously be obtained by blending a polyvinylidene fluoride resin with an organic liquid and a powdery hydrophobic silica, subjecting the resultant blend to melt-molding to form a membrane and extracting the organic liquid and the powdery hydrophobic silica from the membrane.

Accordingly, in another aspect of the present invention, there is provided a method for producing a porous membrane as recited in claim 1, comprising:

(a) blending a polyvinylidene fluoride resin with an organic liquid and a powdery hydrophobic silica;

(b) subjecting the resultant blend to melt-molding to form a membrane; and (c) extracting the organic liquid and the powdery hydrophobic silica from the membrane.

Hereinafter, the method for producing the porous membrane of the present invention will be described in detail.

In step (a), a polyvinylidene fluoride resin, an organic liquid and a powdery hydrophobic silica are blended together.

As the polyvinylidene fluoride resin, a vinylidene fluoride homopolymer and a vinylidene fluoride copolymer described hereinbefore can be used alone or in combination.

It is preferred for the organic liquid which can be employed in the present invention to maintain a liquid, inert state at the time of melt-molding and to be readily soluble in organic solvents or water and easily extractable from the molded membrane. The organic liquid is selected from those having a solubility parameter (SP) value of from 8.4 to 10.5, preferably from 8.4 to 9.9. The "solubility parameter" is a parameter which is used to assess the solubility of polymers in solvents as described by H. Burrell and B. Immergut in "Polymer Handbook" (1966), Part IV, page 34 onwards, and the SP value can be calculated by a formula as described below.

By blending an organic liquid having an SP value within the above-mentioned range with a polyvinylidene fluoride resin and a powdery hydrophobic silica, the organic liquid is well dissolved in the polyvinylidene fluoride resin at the time of melt-molding, and the major part of the organic liquid is caused to be adsorbed on the surface of the powdery hydrophobic silica when the molded membrane is cooled and solidified, leading to an excellent moldability of the blend and an excellent extractability of the organic liquid and hydrophobic silica from a membrane molded from the blend, so that excellent mechanical strengths of the resultant porous membrane can be attained. Furthermore, when the SP value of the organic liquid is within the range of from 8.4 to 10.5, an average pore diameter in the surface of the polyvinylidene fluoride porous membrane can advantageously be adjusted to those which are within the range of from 0.05 to less than 5 $\mu$m.

When the SP value of the organic liquid exceeds 10.5, the amount of the organic liquid dissolved in the polyvinylidene fluoride resin is increased so that the micro-phase separation between the organic liquid and the polyvinylidene fluoride resin is unlikely to occur when the molded membrane is cooled and solidified. As a result, although the components of the melted blend are caused to be well melt-bonded and the mechanical strength of the membrane is improved, the pore-forming activity of the organic liquid disadvantageously becomes poor, so that the average pore diameter of the produced porous membrane is likely to be less than 0.05 $\mu$m.

Moreover, it is disadvantageous in that when the organic liquid and the hydrophobic silica are extracted, a large shrinkage of the polyvinylidene fluoride porous membrane is likely to occur, so that not only is the porosity of the porous membrane decreased, but also the appearance becomes poor.

When an organic liquid having an SP value of less than 8.4 is used, the solubility of the organic liquid in the polyvinylidene fluoride resin is poor and, therefore, the organic liquid is unfavorably liberated from the polyvinylidene fluoride resin at the time of melt-molding. Accordingly, the molecules of the resin are prevented from being melt-bonded, so that not only is the moldability lowered but also an average pore diameter in the surface of the polyvinylidene fluoride porous membrane becomes as large as 5 $\mu$m or more, leading to a lowering of the tensile strength and tensile elongation of the final porous membrane.

Representative examples of organic liquids having an SP value ranging from 8.4 to 10.5 which can be used in the present invention include phthalic esters, such as diethyl phthalate (hereinafter referred to as "DEP"), dibutyl phthalate (hereinafter referred to as "DBP"), diheptyl phthalate and dioctyl phthalate (hereinafter referred to as "DOP"); phosphoric esters; and the like. These organic liquids can be used alone or in combination. In the case where a single organic liquid is used, DOP and DBP are preferred. On the other hand, when a mixture of at least two types of the organic liquids are used, it is preferred that the mixture contain at least 50% by weight of DOP, based on the total weight of the mixture. Of the mixtures, preferred is a mixture of DOP and DBP.

The powdery hydrophobic silica to be used in the present invention functions both as a carrier for retaining the organic liquid and as a nucleus for micro-phase separation between the organic liquid and the resin. That is, the powdery hydrophobic silica prevents the organic liquid from being liberated from the polyvinylidene fluoride resin during melt-molding to thereby facilitate the molding operation. At the same time, the presence of the powdery hydrophobic silica contributes to micro-dispersion of the organic liquid in the resin to thereby prevent aggregation of the organic liquid. Further, during the melt-molding of the blend and cooling of the molded membrane, the powdery hydrophobic silica functions as a nucleus for micro-phase separation between the organic liquid and the resin. Moreover, the powdery hydrophobic silica contributes to pore formation. That is, when the powdery hydrophobic silica is extracted after the blend has been molded into a membrane, pores are formed in the membrane.

The powdery hydrophobic silica used herein means a silica obtained by chemically treating the hydrophilic surface of a powdery hydrophilic silica to thereby convert the hydrophilic surface to a hydrophobic surface. Illustratively stated, the silanol group on the surface of a powdery hydrophilic silica is chemically reacted with an organo-silicon compound, such as dimethyl silane and dimethyl dichlorosilane, to replace the hydrophilic silanol groups on the surface of the powdery hydrophilic silica with methyl groups or the like, to thereby render hydrophobic the powdery hydrophilic silica.

The powdery hydrophobic silica which can be used in the present invention preferably has an average primary particle diameter of from 0.005 to 0.5 $\mu$m and a specific surface area of from 30 to 500 m$^2$/g, more preferably 50 to 300 m$^2$/g, and a methanol wetability (hereinafter referred to as "MeW") of at least 30% by volume in terms of the methanol concentration of an aqueous methanol solution capable of completely wetting the powdery hydrophobic silica. The methanol wetability (MeW) is measured by the method as described below.

When a powdery silica having a methanol wetability of less than 30% is used, the powdery silica is, disadvantageously, likely to agglomerate. Further, since the affinity of the silica for the polyvinylidene fluoride and organic liquid, which are both hydrophobic, is poor alike that of a hydrophilic silica, it is difficult to produce a satisfactorily thin porous membrane, and macrovoids are, disadvantageously, likely to be formed in the membrane, leading to a decrease in mechanical strength of the final porous membrane. Further, due to the presence of macrovoids, an unfavorable pinhole is likely to be formed in the final membrane. Therefore, the productivity (yield of qualified, or acceptable, products) is poor. For these reasons, it is preferred that a powdery hydrophobic silica having a methanol wetability of at least 30% by volume be used in the present invention.

By the use of the above-mentioned powdery hydrophobic silica, aggregation of the silica does not occur and the affinity of the silica for the polyvinylidene fluoride resin and the organic liquid, which are hydrophobic, is excellent as compared to that of a hydrophilic silica. Therefore, a high degree of microdispersion of the powdery hydrophobic silica can be attained, so that occurrence of macrovoids is prevented and a polyvinylidene fluoride porous membrane having a satisfactorily thin thickness and a fine, uniform, three-dimensional, network pore structure can be obtained.

When a hydrophilic silica is used instead of the hydrophobic silica, the moldability of the blend of the polyvinylidene fluoride resin, organic liquid and silica becomes poor and many macrovoids are likely to be formed in the membrane and the network pore structure of the polyvinylidene membrane disadvantageously becomes non-uniform, leading to a lowering in mechanical strength and elongation of the final porous membrane.

In blending a polyvinylidene fluoride with an organic liquid and a powdery hydrophobic silica, the amount of the polyvinylidene fluoride is 10 to 60% by volume, preferably 15 to 40% by volume, based on the total volume of the resultant blend. The amount of the organic liquid is 30 to 75% by volume, preferably 50 to 70% by volume, based on the total volume of the resultant blend. The amount of the powdery hydrophobic silica is 7 to 42% by volume, preferably 10 to 20% by volume, based on the total volume of the resultant blend.

When the amount of the polyvinylidene fluoride is less than 10% by volume, the resultant blend is disadvantageously poor in moldability and a porous membrane produced from the blend becomes poor in mechanical strength. On the other hand, when the amount of the polyvinylidene fluoride is more than 60% by volume, a porous membrane having the desired high porosity cannot be obtained.

When the amount of the organic liquid is less than 30% by volume, the pore formation due to the organic liquid is not satisfactory, leading to a decrease of the degree of porosity of the membrane to as low as less than 40% and, therefore, a porous membrane having the desired porous structure cannot be obtained. On the other hand, when the amount of the organic liquid exceeds 75% by volume, not only is it difficult to mold the blend into a thin membrane but also a porous membrane having excellent mechanical strength cannot be obtained.

When the amount of the powdery hydrophobic silica is less than 7% by volume, it is impossible to adsorb the organic liquid in an amount sufficient to obtain a porous membrane having the desired porous structure. Further, it is difficult for the blend to maintain a powdery or granular form, leading to difficulty in molding. On the other hand, when the amount of the powdery hydrophobic silica is more than 42% by volume, not only is the blend poor in flowability in molding but also the porous film produced from the blend is brittle and therefore cannot be put to practical use.

In step (a), if desired, in addition to the polyvinylidene fluoride resin, powdery hydrophobic silica and organic liquid, an additive, such as a lubricant, an antioxidant, a UV light absorber, a plasticizer and an auxiliary agent for molding can be blended in an amount such that the additive does not destroy the desired properties of the porous membrane.

Blending of the above-mentioned components can generally be performed by means of a conventional blender, such as a Henschel mixer, a V-shaped tumbler and a ribbon blender. The above-mentioned three components can be blended at one time. Alternatively, the blending can be conducted in such a manner that the powdery hydrophobic silica is first blended with the organic liquid to thereby adsorb the organic liquid on the powdery hydrophobic silica, and the polyvinylidene fluoride is then blended with the mixture of the powdery hydrophobic silica and the organic liquid. The latter is preferred because not only can the melt-moldability of the resultant blend be improved, but also the porosity and mechanical strength of the porous membrane produced from the blend can be increased.

In step (b) of the method of the present invention, the resultant blend is subjected to melt-molding to form a membrane. Illustratively stated, the blend obtained in step (a) is melt-kneaded by means of a conventional melt-kneading machine, such as an extruder, a Banbury mixer, a mixing twin roll and a kneader, and then subjected to molding. The molding can be conducted by a conventional method, for example, by T-die extrusion molding, hollow die extrusion molding, inflation, calendar molding, compression molding, injection molding or the like. Melt-molding of the blend can also be conducted by means of an apparatus adapted for both kneading and extrusion, such as an extruder and a kneader-extruder. By the use of such an apparatus, the kneading and molding can be performed simultaneously.

The melt-molding can be effected under molding conditions as ordinarily employed in the molding of a polyvinylidene fluoride resin as long as the molding is effected at a temperature higher than the melting point of the polyvinylidene fluoride resin employed and below the boiling point of the organic liquid employed. Generally, the molding is conducted at about 200° to about 250° C. The period of the molding is not specifically limited and is varied according to the method of molding and the desired thickness of the final membrane. In the case of extrusion molding, for example, the molding can generally be conducted for about 10 to about 20 minutes.

By the above-mentioned melt-molding methods, the blend is generally shaped into a membrane having a thickness of 0.025 to 25 mm. For obtaining a relatively thin membrane having a thickness of 0.025 to 2.5 mm, preferably 0.025 to 0.30 mm, extrusion molding is preferred. The membrane can be produced in any form, that is, in the form of a hollow fiber membrane, a tubular membrane or a flat membrane.

In step (c), the organic liquid and the powdery hydrophobic silica are extracted from the membrane. The extraction of the organic liquid and the powdery hydrophobic silica can be conducted in a manner such that the organic liquid is first extracted and, subsequently, the powdery hydrophobic silica is extracted. Alternatively, the organic liquid and the powdery hydrophobic silica can be simultaneously extracted from the membrane. Of these extraction methods, the former is preferred because extraction of the organic liquid and hydrophobic silica can be performed efficiently.

In the case of the former extraction method, extraction of the organic liquid is conducted at a temperature below the melting point of the polyvinylidene fluoride resin, using a solvent for the organic liquid employed. The solvent is selected from those capable of dissolving the organic liquid but not dissolving the polyvinylidene fluoride resin. Examples of solvents for extracting the organic liquid include alcohols, such as methanol, ethanol and isopropanol; ketones, such as acetone; halogenated hydrocarbons, such as 1,1,1-trichloroethane, and trichloroethylene; and the like. The extraction of the organic liquid can be conducted according to a customary method, such as a batch-type dipping method and a counter-flow method. In the present invention, it is not necessary to completely extract the organic liquid from the membrane, and a small amount of the organic liquid can be left in the membrane. However, when the extraction of the organic liquid is not effected sufficiently, the porosity of the membrane is naturally lowered. The acceptable residual ratio of the organic liquid is generally not higher than 3% by volume, preferably not higher than 1% by volume, based on the volume of the membrane.

The extraction of the organic liquid can be accomplished in a few seconds to several hours.

After the organic liquid has been extracted from the membrane, the membrane can, if desired, be dried to remove the solvent remaining in the membrane.

Subsequently, the powdery hydrophobic silica is extracted from the membrane with an appropriate solvent therefor.

The solvent for extracting the powdery hydrophobic silica is not specifically limited, and a solvent which is capable of dissolving the hydrophobic silica, but does substantially not dissolve the polyvinylidene fluoride resin, can generally be used. Examples of solvents for the hydrophobic silica include aqueous alkaline solutions, such as an aqueous sodium hydroxide solution and an aqueous potassium hydroxide solution.

Before extraction of the powdery hydrophobic silica, in order to effectively extract the silica, it is preferred that the membrane be preliminarily dipped in a 50 to 100% by weight aqueous ethanol solution and then dipped in water so that the membrane is rendered susceptive to an extraction treatment with the above-mentioned aqueous solvent.

According to the present invention, it is not necessary to completely extract the employed hydrophobic silica from the membrane, and a small amount of the hydrophobic silica can be left in the membrane. However, when the extraction of the hydrophobic silica is not effected sufficiently, the porosity of the membrane is naturally lowered. The acceptable residual ratio of the hydrophobic silica is generally not higher than 3% by volume, preferably not higher than 1% by volume, based on the volume of the membrane.

The extraction can be conducted by a customary method, such as a batch-type dipping method and a counter-flow method. By such a conventional method, the extraction is generally completed within several seconds to about 24 hours.

When the organic liquid and the powdery hydrophobic silica are simultaneously extracted from the membrane, an alcohol solution of an alkali, such as sodium hydroxide, can be used as a solvent for the extraction.

After completion of the extraction, if desired, the resultant porous membrane can be subjected to monoaxial or biaxial stretching in order to enlarge the pore diameter and increase the porosity.

The porous membrane of the present invention has not only excellent chemical resistance attributable to the polyvinylidene fluoride resin constituting the matrix of the porous membrane, but also excellent water permeability, gas permeability and excellent filtration properties as well as excellent mechanical strength, due to the uniform, three-dimensional, network pore structure of the porous membrane. Therefore, the porous membrane of the present invention can advantageously be used as a microfilter.

Since the porous membrane of the present invention has excellent chemical resistance and mechanical strength, the membrane can also advantageously be used for refining vegetable oils, such as sunflower oil and rapeseed oil; for refining mineral oils; for recovering useful substances from a fermentation broth; for purifying a pharmaceutical substance; and the like. Further, the porous membrane of the present invention can advantageously be used as a microfilter for removing particulate impurities from a large amount of water.

The present invention will now be described in detail with reference to the following Examples and Comparative Examples that are by no means intended to limit the scope of the present invention.

The properties shown herein were measured by the following methods.

Weight average molecular weight ($\overline{Mw}$): Determined by GPC method in terms of the molecular weight of polystyrene.

GPC measuring apparatus: Model LS-8000 manufactured and sold by Toyo Soda Kogyo K.K., Japan Column: GMHXL Solvent: dimethylformamide Measuring temperature: 40° C.

Component ratio (% by volume): Calculated from the value obtained by dividing the weight of the respective feedstock by its true specific gravity.

Porosity (%): (Pore volume/Porous membrane volume)×100

Pore volume = weight of water-saturated membrane — weight of dry membrane.

Specific surface area ($m^2/g$): Measured according to BET absorption method.

Average pore diameter ($\mu m$) (in the surface of the membrane): Weighted average calculated from the average of the major and minor diameters of 200 pore openings appearing in the surface of the membrane, which major and minor diameters are measured by means of a scanning electron microscope.

Average pore diameter (μm) (in the cross-section of the membrane): The porous membrane is cut at an arbitrary portion along a line perpendicular to the surface thereof, and the major and minor diameters of 200 pore openings appearing in the cross-section of the cut membrane are measured by means of a scanning electron microscope. The average pore diameter (μm) in the cross-section of the membrane is expressed in terms of the weighted average calculated from the average of the major and minor diameters of the 200 pore openings appearing in the cross-section of the membrane.

True average pore diameter (μm): Measured by the half-dry method prescribed in ASTM F316-70.

Maximum pore diameter (μm): Measured by the bubble point method prescribed in ASTM F316-70.

Water permeability (l/m$^2$·hr·atm·25° C.): Measured at 25° C. at a differential water pressure of 1 kg/cm$^2$.

Tensile strength at break (kg/cm$^2$) and tensile elongation at break (%): Measured according to ASTM D882 using an Instron type tension tester (an initial strain rate = 2.0 mm/mm·min).

Solubility parameter (SP) value: Calculated by the following formula (the formula of P. A. Small)

$$SP = d\Sigma G/M$$

wherein d represents specific gravity, G is a molar attraction constant, and M is molecular weight.

Methanol wetability (MeW): 0.2 g of a powdery hydrophobic silica is placed in a beaker and 50 ml of distilled water is introduced into the beaker. While stirring the contents of the beaker by means of a magnetic stirrer, methanol is introduced into the beaker below the surface of the water until all the silica floating on the water sinks in the water. When all the silica has just sunk in the water, the total amount X (ml) of methanol added was determined, and MeW (% by volume) is calculated by the following formula:

$$MeW = X/(50+X) \times 100.$$

EXAMPLE 1

14.8% by volume of a powdery hydrophobic silica [Aerosil R-972 (trade name) manufactured and sold by Japan Aerosil Co., Japan, MeW: 50%, average primary particle diameter: 16 mμ, specific surface area: 110 m$^2$/g], 48.5% by volume of DOP (SP value: 8.9) and 4.4% by volume of DBP (SP value: 9.4) were mixed together in a Henschel mixer and further mixed with 32.3% by volume of polyvinylidene fluoride [Kureha KF polymer 1000 (trade name) manufactured and sold by Kureha Chemical Industry, Co., Ltd., Japan: $\overline{M}w = 242,000$].

The resultant blend was kneaded, extruded and pelletized at 250° C. by means of a twin extruder having a diameter of 30 mm. The pellets thus obtained were extruded using an extruder having an annular hollow fiber spinning nozzle at 230° C. at a spinning rate of 10 m/min, to form a hollow fiber membrane. The extruded hollow fiber was immersed in 1,1,1-trichloroethane at 60° C. for 1 hour to extract the DOP and DBP from the hollow fiber, followed by drying.

Subsequently, the hollow fiber was immersed in a 50% by weight aqueous ethanol solution for 30 minutes and further immersed in water for 30 minutes to render the hollow fiber hydrophilic. The hydrophilic hollow fiber was immersed in a 20% aqueous solution of sodium hydroxide at 70° C. for 1 hour to extract the powdery hydrophobic silica therefrom, followed by washing with water and drying.

The polyvinylidene fluoride, hollow fiber, porous membrane thus obtained had an outside diameter of 2.00 mm, an inside diameter of 1.10 mm and a porosity of 66.0%. Average pore diameters of the open pores in the outer surface and the inner surface, and an average pore diameter of the running pores in the interior of the membrane, the latter average pore diameter being in terms of an average pore diameter of pores in a cross-section of the membrane taken along a line perpendicular to each surface, were 1.87 μm, 0.86 μm and 1.05 μm, respectively. The ratio of the average pore diameter of the open pores in the outer surface of the porous membrane to the average pore diameter of the pores in the cross-section of the porous membrane was 1.78, and the ratio of the average pore diameter of the open pores in the inner surface of the porous membrane to the average pore diameter of the pores in the cross-section of the porous membrane was 0.82. The true average pore diameter of pores of the porous membrane as measured by the half-dry method was 0.59 μm and the maximum pore diameter of pores of the porous membrane as measured by the bubble point method was 0.91 μm. The ratio of the maximum pore diameter of the porous membrane to the true average pore diameter of the pores was 1.54. The water permeability of the porous membrane was 7000 l/m$^2$·hr·atm·25° C. The tensile strength at break and the tensile elongation at break of the porous membrane were 115 kg/cm$^2$ and 300%, respectively. Scanning electron photomicrographs of the outer surface, the inner surface and the cross-section of the porous membrane (magnification: 3,000-fold) and the cross-section of the porous membrane (magnification: 200-fold) are shown in FIGS. 1 (a) to (d), respectively. The polyvinylidene fluoride, hollow fiber, porous membrane had a uniform, three-dimensional, network pore structure and the interior of the porous membrane contained substantially no macrovoids having a diameter of 10 μm or more.

COMPARATIVE EXAMPLE 1

A polyvinylidene fluoride, hollow fiber, porous membrane was prepared in substantially the same manner as described in Example 1 except that a powdery hydrophilic silica [Nipsil LP (trade name) manufactured and sold by Nippon Silica Co., Japan, MeW: 0%, average primary particle diameter: 16 mμ, specific surface area : 280 m$^2$/g] was used instead of the powdery hydrophobic silica.

Figure 2:
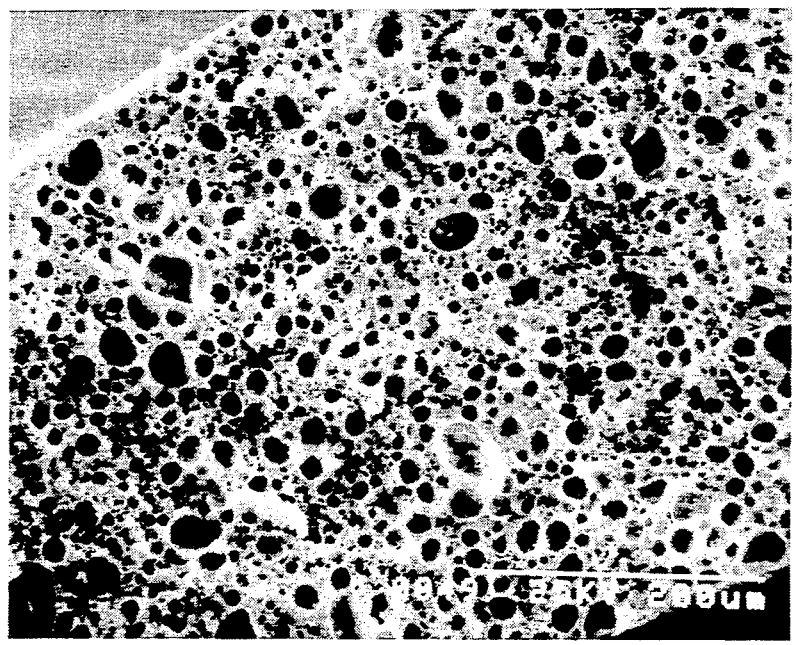
FIG. 2 is a scanning electron photomicrograph (magnification: 200-fold) of a cross-section of a conventional hollow fiber porous membrane produced in Comparative Example 1 taken along a line perpendicular to each surface of the membrane.

The polyvinylidene fluoride, hollow fiber, porous membrane thus obtained had a true average pore diameter of 0.40 μm as measured by the half-dry method, a maximum pore diameter of 1.00 μm as measured by the bubble point method and a water permeability of 2500 l/m$^2$·hr·atm·25° C. The tensile strength at break and the tensile elongation at break of the porous membrane were extremely low, that is, as low as 60 kg/cm$^2$ and 50%, respectively. A scanning electron photomicrograph of the cross-section of the polyvinylidene fluoride, hollow fiber, porous membrane is shown in FIG. 2. As apparent from FIG. 2, the porous membrane had a non-uniform, porous structure, wherein many macrovoids are present.

EXAMPLE 2

Pellets comprising a polyvinylidene fluoride resin, an organic liquid and a powdery hydrophobic silica were prepared in substantially the same manner as described in Example 1. The pellets were extruded using a twin screw extruder having a screw diameter of 30 mm and equipped with a T-die of 450 mm width at 230° C. at an extruding rate of 10 m/min to form a flat membrane.

The obtained flat membrane was immersed in 1,1,1-trichloroethane at 60° C. for 1 hour to extract the DOP and DBP, followed by drying.

Subsequently, the membrane was immersed in a 50% aqueous ethanol solution for 30 minutes and further immersed in water for 30 minutes to render the membrane hydrophilic. The membrane was immersed in a 20% aqueous solution of sodium hydroxide at 70° C. for 1 hour to extract the powdery hydrophobic silica, followed by washing with water and drying.

The polyvinylidene fluoride, flat porous membrane thus obtained had a thickness of 110 μm and a porosity of 64.0%. Average pore diameters of the open pores in one surface and the other surface of the porous, flat membrane, and an average pore diameter of the pores in the interior of the membrane in terms of an average pore diameter in a cross-section of the porous membrane as measured by means of a scanning electron microscope were 1.55 μm, 1.20 μm and 1.32 μm, respectively. The ratio of the average pore diameter of the open pores in one surface of the porous membrane to the average pore diameter of the pores in the cross-section of the porous membrane was 1.17, and the ratio of the average pore diameter of the open pores in the other surface of the porous membrane to the average pore diameter of the pores in the cross-section of the porous membrane was 0.91.

The true average pore diameter of the pores of the porous membrane as measured by the half-dry method was 0.67 μm and the maximum pore diameter of the pores of the porous membrane as measured by the bubble point method was 1.01 μm. The ratio of the maximum pore diameter of the pores of the porous membrane to the true average pore diameter of the pores of the porous membrane was 1.51. The water permeability of the polyvinylidene fluoride, flat porous membrane was 15,000 l/m²·hr·atm·25° C. The tensile strength at break and the tensile elongation at break of the porous membrane were 120 kg/cm² and 340%, respectively. Observation of cross-sections of the polyvinylidene fluoride, flat porous membrane by means of a scanning electron microscope showed that the porous membrane had a uniform, three-dimensional, network pore structure and the interior of the membrane contained substantially no macrovoids having a diameter of 10 μm or more.

COMPARATIVE EXAMPLE 2

16% by weight of polyvinylidene fluoride [Kynar 301F (trade name) manufactured by Pennwalt Company, U.S.A. ($\overline{M}w$=460,000)], 64% by weight of N-methyl-2-pyrrolidone (hereinafter referred to as "NMP"), 10% by weight of cyclohexane and 10% by weight of polyvinylidene pyrrolidone [K-30 (trade name) manufactured and sold by Wako Pure Chemical Industries Ltd., Japan (molecular weight 40,000)] were mixed to obtain a homogenous solution for preparing a membrane. The homogenous solution was cast onto a glass plate to form a membrane and allowed to stand in the air for 5 minutes. After the cast membrane became sufficiently opaque, the cast membrane was immersed in a water bath to obtain a polyvinylidene fluoride, flat porous membrane.

The polyvinylidene fluoride, flat porous membrane had a membrane thickness of 130 μm, a true average pore diameter of 0.63 μm as measured by the half-dry method, a maximum pore diameter of 1.90 μm as measured by the bubble point method and a water permeability of 14,000 l/m²·hr·atm·25° C. The tensile strength at break and the tensile elongation at break of the porous membrane were extremely low, that is, as low as 13 kg/cm² and 35%, respectively. Therefore, the porous membrane thus obtained could not be practically used.

COMPARATIVE EXAMPLE 3

Substantially the same procedure as described in Comparative Example 2 was repeated to obtain a solution for preparing a membrane. The solution was cast onto a glass plate and immersed in a coagulating liquid consisting of 70% by weight of NMP, 15% by weight of methanol and 15% by weight of distilled water. Two minutes after the cast membrane became opaque in the liquid, the cast membrane was taken out of the liquid and then immersed in a water bath to obtain a polyvinylidene fluoride, flat porous membrane.

The polyvinylidene fluoride, flat porous membrane thus obtained had a membrane thickness of 80 μm, a true average pore diameter of 0.19 μm as measured by the half-dry method, a maximum pore diameter of 0.78 μm as measured by the bubble point method and a water permeability of 260 l/m²·hr·atm·25° C. The tensile strength at break and the tensile elongation at break of the polyvinylidene fluoride porous membrane were extremely low, that is, as low as 23 kg/cm² and 2%, respectively. Therefore, the porous membrane could not be practically used.

EXAMPLES 3 AND 4

A polyvinylidene fluoride, hollow fiber, porous membrane was prepared in substantially the same manner as described in Example 1 except that the amounts of the polyvinylidene fluoride, hydrophobic silica, DOP and DBP were varied as shown in Table 1. The properties of the polyvinylidene fluoride, hollow fiber, porous membrane thus obtained are shown in Table 1. Each of the porous membranes had an excellent tensile elongation at break.

TABLE 1

| Examples | Composition (% by volume) | | | | Outside diameter (mm) | Inside diameter (mm) | Average pore diameter (μm) | Maximum pore diameter (μm) | Water permeability (l/m² hr · atm 25° C.) | Tensile strength at break (kg/cm²) | Tensile elongation at break (%) |
|---|---|---|---|---|---|---|---|---|---|---|---|
|  | PVDF | Hydrophobic silica | DOP | DBP | | | | | | | |
| 3 | 31.5 | 12.2 | 51.0 | 5.3 | 1.98 | 1.02 | 0.94 | 1.57 | 8240 | 121 | 378 |

TABLE 1-continued

| Examples | Composition (% by volume) | | | | Outside diameter (mm) | Inside diameter (mm) | Average pore diameter (μm) | Maximum pore diameter (μm) | Water permeability (l/m² hr · atm 25° C.) | Tensile strength at break (kg/cm²) | Tensile elongation at break (%) |
|---|---|---|---|---|---|---|---|---|---|---|---|
| | PVDF | Hydrophobic silica | DOP | DBP | | | | | | | |
| 4 | 31.7 | 12.2 | 45.5 | 10.6 | 2.03 | 1.11 | 0.26 | 0.44 | 2370 | 73 | 182 |

Note:
PVDF: polyvinylidene fluoride
DOP: dioctyl phthalate
DBP: dibutyl phthalate

EXAMPLE 5

A polyvinylidene fluoride, hollow fiber, porous membrane was prepared in substantially the same manner as described in Example 1 except that diheptyl phthalate was used as an organic liquid and 31.3% by volume of the polyvinylidene fluoride, 12.5% by volume of the powdery hydrophobic silica and 56.2% by volume of the organic liquid were used. The properties of the polyvinylidene fluoride, hollow fiber, porous membrane are shown in Table 2.

TABLE 2

| Example | Organic liquid | Outside diameter (mm) | Inside diameter (mm) | Maximum pore diameter (μm) | Water permeability (l/m² · hr atm · 25° C.) | Tensile strength at break (kg/cm²) | Tensile elongation at break (%) |
|---|---|---|---|---|---|---|---|
| 5 | Diheptyl phthalate | 2.26 | 1.50 | 0.28 | 680 | 80 | 200 |

EXAMPLE 6

A polyvinylidene fluoride, hollow fiber, porous membrane was prepared in substantially the same manner as described in Example 1 except that a powdery hydrophobic silica [Nipsil SS-50F (trade name) manufactured and sold by Nippon Silica Co., Japan, MeW: 60%, average primary particle diameter: 16 mμ, specific surface area : 75 m²/g] was used instead of Aerosil R-972.

The polyvinylidene fluoride porous membrane thus obtained had a true average pore diameter of 0.65 μm as measured by the half-dry method, a maximum pore diameter of 1.10 μm as measured by the bubble point method, a water permeability of 8500 l/m²·hr·atm·25° C., a tensile strength at break of 100 kg/cm² and a tensile elongation at break of 250%. Observation of the porous membrane by means of a scanning electron microscope showed that the porous membrane had a uniform, three-dimensional, network pore structure and the interior of the membrane contained substantially no macrovoids having a diameter of 10 μm or more.

What is claimed is:

1. A porous membrane comprising a polyvinylidene fluoride, resin and having pores running throughout an interior of said porous membrane and opening at both surfaces of said porous membrane,
said interior of said porous membrane containing substantially no macrovoids having a diameter of 10 μm or more,
the average diameter of said pores in each surface of said porous membrane being within the range of from 0.05 μm to less than 5 μm,
the ratio of the average pore diameter of said pores at each surface of said porous membrane to the average pore diameter of said pores in the interior of said porous membrane in terms of the average pore diameter of pores in a cross-section of said porous membrane taken along a line perpendicular to each surface of said porous membrane, being from 0.5 to 2.0,
the ratio of the maximum pore diameter of said pores as measured by the bubble point method to a true average pore diameter of said pores as measured by the half-dry method being from 1.2 to 2.5,
and said membrane having a uniform, three-dimensional, network pore structure, and a tensile strength at break of from 70 to 200 kg/cm², a tensile elongation at break of from 100 to 500% and a porosity of from 40 to 90%.

2. The porous membrane according to claim 1, wherein said polyvinylidene fluoride resin is a vinylidene fluoride homopolymer or a copolymer of vinylidene fluoride and at least one comonomer selected from the group consisting of ethylene tetrafluoride, propylene hexafluoride, trifluorochloroethylene and ethylene.

3. The porous membrane according to claim 1, wherein said interior contains substantially no macrovoids having a diameter of 5 μm or more.

4. A method for producing a porous membrane of claim 1, comprising:
(a) blending a polyvinylidene fluoride resin with an organic liquid and a powdery hydrophobic silica;
(b) subjecting the resultant blend to melt-molding to form a membrane; and
(c) extracting said organic liquid and said powdery hydrophobic silica from said membrane.

5. The method according to claim 4, wherein in step (c), said organic liquid is first extracted and, subsequently, said powdery hydrophobic silica is extracted.

6. The method according to claim 4, wherein in step (c), said organic liquid and said powdery hydrophobic silica are simultaneously extracted from said membrane.

7. The method according to any one of claims 4 to 6, wherein said powdery hydrophobic silica has an average primary particle diameter of from 0.005 to 0.5 μm, a specific surface area of from 30 to 500 m²/g and a methanol wettability of at least 30% by volume in terms of the methanol concentration of an aqueous methanol solution capable of completely wetting said powdery hydrophobic silica.

8. The method according to any one of claims 4 to 6, wherein said powdery hydrophobic silica has an average primary particle diameter of from 0.005 to 0.5 μm, a specific surface area of from 50 to 300 m²/g and a methanol wettability of at least 30% by volume in terms of the methanol concentration of an aqueous methanol solution capable of completely wetting said powdery hydrophobic silica.

9. The method according to any one of claims 4 to 6, wherein said organic liquid has a solubility parameter of from 8.4 to 10.5.

10. The method according to any one of claims 4 to 6, wherein said organic liquid is a mixture of at least two different types of organic liquids each having a solubility parameter of from 8.4 to 10.5.

11. The method according to claim 10, wherein said mixture contains at least 50% by weight of dioctyl phthalate, based on the total weight of said mixture.

12. The method according to any one of claims 4 to 6, wherein said polyvinylidene fluoride resin is a vinylidene fluoride homopolymer or a copolymer of vinylidene fluoride and at least one comonomer selected from the group consisting of ethylene tetrafluoride, propylene hexafluoride, trifluorochloroethylene and ethylene.

* * * * *